(12) United States Patent
Dawson et al.

(10) Patent No.: US 12,251,973 B2
(45) Date of Patent: Mar. 18, 2025

(54) VIBRATION ABSORBER

(71) Applicant: APPLE INC., Cupertino, CA (US)

(72) Inventors: Jacob L. Dawson, Sunnyvale, CA (US); Daniel T. Williams, San Jose, CA (US); Andrew J. Gunnion, Campbell, CA (US)

(73) Assignee: APPLE INC., Cupertino, CA (US)

( * ) Notice: Subject to any disclaimer, the term of this patent is extended or adjusted under 35 U.S.C. 154(b) by 14 days.

(21) Appl. No.: 18/198,033

(22) Filed: May 16, 2023

(65) Prior Publication Data

US 2023/0398826 A1 Dec. 14, 2023

Related U.S. Application Data

(60) Provisional application No. 63/351,070, filed on Jun. 10, 2022.

(51) Int. Cl.
*B60G 13/18* (2006.01)

(52) U.S. Cl.
CPC .......... *B60G 13/18* (2013.01); *B60G 2202/24* (2013.01); *B60G 2202/25* (2013.01); *B60G 2204/30* (2013.01); *B60G 2206/41* (2013.01)

(58) Field of Classification Search
CPC ..... B60R 13/16; B60R 13/18; B60G 2202/25; B60G 2204/30; B60G 2206/41
See application file for complete search history.

(56) References Cited

U.S. PATENT DOCUMENTS

| 2,537,479 A | 1/1951 | Motte |
|---|---|---|
| 2,757,938 A | 8/1956 | Crowder |
| 2,901,239 A | 8/1959 | Sethna |
| 2,913,252 A | 11/1959 | Norrie |
| 2,955,841 A | 10/1960 | Faiver et al. |

(Continued)

FOREIGN PATENT DOCUMENTS

| CN | 108215946 A | 6/2018 |
|---|---|---|
| CN | 208439009 U | 1/2019 |

(Continued)

OTHER PUBLICATIONS

Baumann et al., Protective device for protecting body of passenger car against impact during collision, has gliding wedge including support surface, which outwardly deflects vehicle wheel, Sep. 12, 2013, EPO, DE 10 2012 004 682 A1, Machine Translation of Description (Year: 2013).*

(Continued)

*Primary Examiner* — James A English
(74) *Attorney, Agent, or Firm* — Young Basile Hanlon & MacFarlane, P.C.

(57) ABSTRACT

A tuned mass damper includes a damper mass having a first mass portion and a second mass portion connected by a third mass portion. The first mass portion, the second mass portion, and the third mass portion form a U-shaped configuration of the damper mass. The damper mass is configured to separate within the third mass portion in response to a force transferred to the damper mass of the tuned mass damper to allow relative motion between the first mass portion and the second mass portion. The damper mass may include geometric features that promote rotation of the tuned mass damper relative to an axis, when subjected to impact loads.

20 Claims, 7 Drawing Sheets

(56) References Cited

U.S. PATENT DOCUMENTS

| | | |
|---|---|---|
| 3,089,710 A | 5/1963 | Ernest |
| 3,231,058 A | 1/1966 | Batchelor et al. |
| 3,236,334 A | 2/1966 | Wallerstein, Jr. |
| 3,322,379 A | 5/1967 | Flannelly |
| 3,368,824 A | 2/1968 | Julien |
| 3,441,238 A | 4/1969 | Flannelly |
| 3,781,032 A | 12/1973 | Jones |
| 3,970,162 A | 7/1976 | Le Salver et al. |
| 4,206,935 A | 6/1980 | Sheppard et al. |
| 4,379,572 A | 4/1983 | Hedenberg |
| 4,530,514 A | 7/1985 | Ito |
| 4,537,420 A | 8/1985 | Ito et al. |
| 4,589,678 A | 5/1986 | Lund |
| 4,613,152 A | 9/1986 | Booher |
| 4,614,359 A | 9/1986 | Lundin et al. |
| 4,634,142 A | 1/1987 | Woods et al. |
| 4,637,628 A | 1/1987 | Perkins |
| 4,643,270 A | 2/1987 | Beer |
| 4,656,409 A | 4/1987 | Shimizu |
| 4,659,106 A | 4/1987 | Fujita et al. |
| 4,784,378 A | 11/1988 | Ford |
| 4,834,416 A | 5/1989 | Shimoe et al. |
| 4,877,098 A | 10/1989 | Asanuma |
| 4,893,832 A | 1/1990 | Booher |
| 4,922,159 A | 5/1990 | Phillips et al. |
| 4,926,978 A | 5/1990 | Shibata et al. |
| 4,960,290 A | 10/1990 | Bose |
| 4,981,309 A | 1/1991 | Froeschle et al. |
| 4,991,698 A | 2/1991 | Hanson |
| 5,027,048 A | 6/1991 | Masrur et al. |
| 5,033,028 A | 7/1991 | Browning |
| 5,060,959 A | 10/1991 | Davis et al. |
| 5,103,942 A | 4/1992 | Schmitt |
| 5,172,930 A | 12/1992 | Boye et al. |
| 5,244,053 A | 9/1993 | Kashiwagi |
| 5,251,926 A | 10/1993 | Aulerich et al. |
| 5,364,081 A | 11/1994 | Hartl |
| 5,392,882 A | 2/1995 | Mackovjak et al. |
| 5,401,053 A | 3/1995 | Sahm et al. |
| 5,409,254 A | 4/1995 | Minor et al. |
| 5,468,055 A | 11/1995 | Simon et al. |
| 5,507,518 A | 4/1996 | Nakahara et al. |
| 5,517,414 A | 5/1996 | Hrovat |
| 5,612,110 A | 3/1997 | Watremez |
| 5,645,250 A | 7/1997 | Gevers |
| 5,678,847 A | 10/1997 | Izawa et al. |
| 5,785,345 A | 7/1998 | Barlas et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,142,494 A | 11/2000 | Higuchi |
| 6,152,267 A | 11/2000 | Iwai et al. |
| 6,170,838 B1 | 1/2001 | Laurent et al. |
| 6,233,510 B1 | 5/2001 | Platner et al. |
| 6,249,728 B1 | 6/2001 | Streiter |
| 6,260,869 B1 | 7/2001 | Hanlon et al. |
| 6,276,710 B1 | 8/2001 | Sutton |
| 6,314,353 B1 | 11/2001 | Ohsaku et al. |
| 6,357,770 B1 | 3/2002 | Carpiaux et al. |
| 6,364,078 B1 | 4/2002 | Parison et al. |
| 6,443,436 B1 | 9/2002 | Schel |
| 6,470,248 B2 | 10/2002 | Shank et al. |
| 6,502,837 B1 | 1/2003 | Hamilton et al. |
| 6,513,819 B1 | 2/2003 | Oliver et al. |
| 6,634,445 B2 | 10/2003 | Dix et al. |
| 6,637,561 B1 | 10/2003 | Collins et al. |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,597,169 B2 | 10/2009 | Borroni-Bird et al. |
| 7,641,010 B2 | 1/2010 | Mizutani et al. |
| 7,644,938 B2 | 1/2010 | Yamada |
| 7,654,540 B2 | 2/2010 | Parison et al. |
| 7,734,384 B2 | 6/2010 | Konopa et al. |
| 7,818,109 B2 | 10/2010 | Scully |
| 7,823,891 B2 | 11/2010 | Bushko et al. |
| 7,899,607 B2 | 3/2011 | Shin et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |
| 8,113,522 B2 | 2/2012 | Oteman et al. |
| 8,127,900 B2 | 3/2012 | Inoue |
| 8,157,036 B2 | 4/2012 | Yogo et al. |
| 8,191,874 B2 | 6/2012 | Inoue et al. |
| 8,282,149 B2 | 10/2012 | Kniffin et al. |
| 8,336,319 B2 | 12/2012 | Johnston et al. |
| 8,356,861 B2 | 1/2013 | Kniffin et al. |
| 8,360,387 B2 | 1/2013 | Breen et al. |
| 8,370,022 B2 | 2/2013 | Inoue et al. |
| 8,387,762 B2 | 3/2013 | Kondo et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |
| 8,474,801 B2 | 7/2013 | Ishiguro et al. |
| 8,490,761 B2 | 7/2013 | Kondo |
| 8,499,903 B2 | 8/2013 | Sakuta et al. |
| 8,525,453 B2 | 9/2013 | Ogawa |
| 8,548,678 B2 | 10/2013 | Ummethala et al. |
| 8,579,311 B2 | 11/2013 | Butlin, Jr. et al. |
| 8,598,831 B2 | 12/2013 | Ogawa et al. |
| 8,632,078 B2 | 1/2014 | Ehrlich et al. |
| 8,641,052 B2 | 2/2014 | Kondo et al. |
| 8,641,053 B2 | 2/2014 | Pare et al. |
| 8,668,060 B2 | 3/2014 | Kondo et al. |
| 8,682,530 B2 | 3/2014 | Nakamura |
| 8,701,845 B2 | 4/2014 | Kondo |
| 8,725,351 B1 | 5/2014 | Selden et al. |
| 8,744,680 B2 | 6/2014 | Rieger et al. |
| 8,744,694 B2 | 6/2014 | Ystueta |
| 8,757,309 B2 | 6/2014 | Schmitt et al. |
| 8,783,430 B2 | 7/2014 | Brown |
| 8,890,461 B2 | 11/2014 | Knox et al. |
| 8,930,074 B1 | 1/2015 | Lin |
| 8,938,333 B2 | 1/2015 | Bose et al. |
| 9,033,121 B2 | 5/2015 | Kazmirski et al. |
| 9,038,271 B2 | 5/2015 | Huang et al. |
| 9,062,737 B2 | 6/2015 | Hoult |
| 9,062,983 B2 | 6/2015 | Zych |
| 9,079,473 B2 | 7/2015 | Lee et al. |
| 9,102,209 B2 | 8/2015 | Giovanardi et al. |
| 9,291,300 B2 | 3/2016 | Parker et al. |
| 9,316,667 B2 | 4/2016 | Ummethala et al. |
| 9,349,304 B2 | 5/2016 | Sangermano et al. |
| 9,399,384 B2 | 7/2016 | Lee et al. |
| 9,428,029 B2 | 8/2016 | Job |
| 9,533,539 B2 | 1/2017 | Eng et al. |
| 9,550,495 B2 | 1/2017 | Tatourian et al. |
| 9,625,902 B2 | 4/2017 | Knox |

(56) References Cited

U.S. PATENT DOCUMENTS

| | | |
|---|---|---|
| 9,643,467 B2 | 5/2017 | Selden et al. |
| 9,676,244 B2 | 6/2017 | Giovanardi et al. |
| 9,702,349 B2 | 7/2017 | Anderson et al. |
| 9,821,835 B2 | 11/2017 | Nieto et al. |
| 9,855,887 B1 | 1/2018 | Potter et al. |
| 9,868,332 B2 | 1/2018 | Anderson et al. |
| 9,884,545 B1 | 2/2018 | Addanki et al. |
| 9,909,644 B2 | 3/2018 | Cegar et al. |
| 9,975,391 B2 | 5/2018 | Tseng et al. |
| 10,054,203 B2 | 8/2018 | Fida |
| 10,065,474 B2 | 9/2018 | Trangbaek |
| 10,081,408 B2 | 9/2018 | Yoshida |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,378,599 B2 | 8/2019 | Mettrick et al. |
| 10,407,035 B1 | 9/2019 | Gadda et al. |
| 10,513,161 B2 | 12/2019 | Anderson et al. |
| 10,960,723 B1 | 3/2021 | Hall et al. |
| 11,078,981 B2 | 8/2021 | Zhang et al. |
| 11,285,773 B1 | 3/2022 | Hall et al. |
| 11,634,167 B1 * | 4/2023 | Dowle .................. B60G 11/14 180/6.62 |
| 11,828,339 B1 * | 11/2023 | Hall .................... F16D 65/0018 |
| 12,054,028 B1 * | 8/2024 | Carter .................. B60G 17/016 |
| 12,168,375 B1 | 12/2024 | Dawson et al. |
| 12,215,747 B1 | 2/2025 | Hall et al. |
| 2001/0045719 A1 | 11/2001 | Smith |
| 2002/0190486 A1 | 12/2002 | Phillis et al. |
| 2003/0030241 A1 | 2/2003 | Lawson |
| 2003/0080526 A1 | 5/2003 | Conover |
| 2004/0054455 A1 | 3/2004 | Voight et al. |
| 2004/0074720 A1 | 4/2004 | Thieltges |
| 2004/0094912 A1 | 5/2004 | Niwa et al. |
| 2004/0226788 A1 | 11/2004 | Tanner |
| 2004/0245732 A1 | 12/2004 | Kotulla et al. |
| 2005/0051986 A1 | 3/2005 | Galazin et al. |
| 2005/0096171 A1 | 5/2005 | Brown et al. |
| 2005/0199457 A1 | 9/2005 | Beck |
| 2005/0206231 A1 | 9/2005 | Lu et al. |
| 2005/0211516 A1 | 9/2005 | Kondo et al. |
| 2005/0230170 A1 | 10/2005 | Robinson |
| 2005/0241899 A1 | 11/2005 | Rutz et al. |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0273530 A1 | 12/2006 | Zuber |
| 2007/0045036 A1 | 3/2007 | Takeuchi et al. |
| 2007/0069496 A1 | 3/2007 | Rinehart et al. |
| 2007/0107959 A1 | 5/2007 | Suzuki et al. |
| 2007/0114706 A1 | 5/2007 | Myers |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0111334 A1 | 5/2008 | Inoue et al. |
| 2008/0164111 A1 | 7/2008 | Inoue et al. |
| 2008/0185807 A1 | 8/2008 | Takenaka |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0071743 A1 | 3/2009 | Gashi |
| 2009/0095584 A1 | 4/2009 | Kondo et al. |
| 2009/0120745 A1 | 5/2009 | Kondo et al. |
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059959 A1 | 3/2010 | Kim |
| 2010/0116572 A1 | 5/2010 | Schmitt et al. |
| 2010/0200343 A1 | 8/2010 | Kondo et al. |
| 2010/0207344 A1 | 8/2010 | Nakamura |
| 2010/0222960 A1 | 9/2010 | Oida et al. |
| 2010/0230876 A1 | 9/2010 | Inoue et al. |
| 2010/0252376 A1 | 10/2010 | Chern et al. |
| 2010/0253019 A1 | 10/2010 | Ogawa |
| 2011/0115183 A1 | 5/2011 | Alesso et al. |
| 2011/0209938 A1 | 9/2011 | Basadzishvili |
| 2011/0226570 A1 | 9/2011 | Ludwig |
| 2011/0250477 A1 | 10/2011 | Yoshida et al. |
| 2011/0277241 A1 | 11/2011 | Schejbal |
| 2012/0013277 A1 | 1/2012 | Ogawa |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 | 7/2012 | Kondo et al. |
| 2012/0193847 A1 | 8/2012 | Muragishi et al. |
| 2012/0305348 A1 | 12/2012 | Katayama et al. |
| 2012/0306170 A1 | 12/2012 | Serbu et al. |
| 2013/0032442 A1 | 2/2013 | Tuluie |
| 2013/0037362 A1 | 2/2013 | Gartner et al. |
| 2013/0060422 A1 | 3/2013 | Ogawa et al. |
| 2013/0060423 A1 | 3/2013 | Jolly |
| 2013/0087420 A1 | 4/2013 | Fraley et al. |
| 2013/0106073 A1 | 5/2013 | Koku et al. |
| 2013/0112514 A1 | 5/2013 | Hanna et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0253764 A1 | 9/2013 | Kikuchi et al. |
| 2013/0277155 A1 | 10/2013 | Huang et al. |
| 2013/0341143 A1 * | 12/2013 | Brown .................... F16F 7/104 188/380 |
| 2014/0001687 A1 | 1/2014 | Braman et al. |
| 2014/0005888 A1 | 1/2014 | Bose et al. |
| 2014/0145498 A1 | 5/2014 | Yamakado et al. |
| 2014/0156143 A1 | 6/2014 | Evangelou et al. |
| 2014/0260233 A1 | 9/2014 | Giovanardi et al. |
| 2014/0312580 A1 | 10/2014 | Gale |
| 2014/0358378 A1 | 12/2014 | Howard et al. |
| 2015/0047933 A1 | 2/2015 | Keil et al. |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231939 A1 | 8/2015 | Yamamotoya et al. |
| 2015/0231942 A1 | 8/2015 | Trangbaek et al. |
| 2015/0343876 A1 | 12/2015 | Yoshizawa et al. |
| 2015/0354647 A1 | 12/2015 | Tironi et al. |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0200164 A1 | 7/2016 | Tabata et al. |
| 2016/0291574 A1 | 10/2016 | Parison |
| 2016/0339823 A1 | 11/2016 | Smith et al. |
| 2016/0347143 A1 | 12/2016 | Hrovat et al. |
| 2017/0047823 A1 | 2/2017 | Sangermano, III et al. |
| 2017/0100980 A1 | 4/2017 | Tsuda |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0144501 A1 | 5/2017 | Wall |
| 2017/0203673 A1 | 7/2017 | Parker et al. |
| 2017/0240018 A1 | 8/2017 | Mettrick et al. |
| 2017/0241504 A1 | 8/2017 | Delorenzis et al. |
| 2017/0253101 A1 | 9/2017 | Kuriki |
| 2017/0253155 A1 | 9/2017 | Knox et al. |
| 2018/0015801 A1 | 1/2018 | Mohamed et al. |

(56) References Cited

U.S. PATENT DOCUMENTS

| | | |
|---|---|---|
| 2018/0022178 A1 | 1/2018 | Xi |
| 2018/0029585 A1 | 2/2018 | Tanimoto |
| 2018/0056748 A1 | 3/2018 | Grimes |
| 2018/0056767 A1 | 3/2018 | Dolgov et al. |
| 2018/0065438 A1 | 3/2018 | Ogawa et al. |
| 2018/0079272 A1 | 3/2018 | Aikin |
| 2018/0089901 A1 | 3/2018 | Rober et al. |
| 2018/0105082 A1 | 4/2018 | Knox |
| 2018/0126816 A1 | 5/2018 | Kondo et al. |
| 2018/0134111 A1 | 5/2018 | Toyohira et al. |
| 2018/0162186 A1 | 6/2018 | Anderson et al. |
| 2018/0162187 A1 | 6/2018 | Trangbaek |
| 2018/0195570 A1 | 7/2018 | Churchill et al. |
| 2018/0208009 A1 | 7/2018 | McGuire et al. |
| 2018/0222274 A1 | 8/2018 | Davis et al. |
| 2018/0297587 A1 | 10/2018 | Kasaiezadeh Mahabadi et al. |
| 2018/0345747 A1 | 12/2018 | Boon et al. |
| 2018/0370314 A1 | 12/2018 | Higle |
| 2019/0011004 A1 | 1/2019 | Mettrick et al. |
| 2019/0023094 A1 | 1/2019 | Panagis et al. |
| 2019/0118604 A1 | 4/2019 | Suplin et al. |
| 2019/0248203 A1 | 8/2019 | Krehmer et al. |
| 2019/0308484 A1 | 10/2019 | Belter et al. |
| 2020/0088214 A1 | 3/2020 | Woodard et al. |
| 2020/0171907 A1 | 6/2020 | Hall et al. |
| 2020/0180386 A1 | 6/2020 | Tabata et al. |
| 2020/0216128 A1 | 7/2020 | Doerksen |
| 2021/0061046 A1 | 3/2021 | Simon et al. |
| 2021/0070129 A1 | 3/2021 | Keil |
| 2021/0199169 A1 | 7/2021 | Morton et al. |
| 2021/0252935 A1 | 8/2021 | Belter et al. |
| 2022/0250432 A1 | 8/2022 | Hawkins |
| 2022/0388364 A1 | 12/2022 | Fowle et al. |

FOREIGN PATENT DOCUMENTS

| | | | |
|---|---|---|---|
| CN | 111139730 B | 6/2021 | |
| CN | 109955704 B | 8/2021 | |
| CN | 115560031 A | 1/2023 | |
| CN | 115637638 A | 1/2023 | |
| DE | 4037223 A1 | 10/1991 | |
| DE | 19853876 A1 | 5/2000 | |
| DE | 19850169 C1 | 7/2000 | |
| DE | 102009060213 A1 | 6/2011 | |
| DE | 102010030700 A1 | 1/2012 | |
| DE | 102010041404 A1 | 3/2012 | |
| DE | 202012002846 U1 | 7/2012 | |
| DE | 102012004682 A1 * | 9/2013 | B62D 21/152 |
| DE | 102015003530 A1 | 9/2016 | |
| DE | 102016000686 A1 | 7/2017 | |
| DE | 102016112240 A1 | 1/2018 | |
| DE | 102018208774 A1 | 12/2019 | |
| EP | 0344923 A1 | 12/1989 | |
| EP | 1693233 B1 | 4/2009 | |
| EP | 2072855 A1 | 6/2009 | |
| EP | 2233330 B1 | 2/2013 | |
| EP | 3088230 A1 | 11/2016 | |
| EP | 2976544 B1 | 11/2018 | |
| GB | 2220625 A | 1/1990 | |
| GB | 2437633 A | 10/2007 | |
| GB | 2539866 A | 1/2017 | |
| JP | S61155211 U | 9/1986 | |
| JP | H06183365 A | 7/1994 | |
| JP | 2004155258 A | 6/2004 | |
| JP | 2005289321 A | 10/2005 | |
| JP | 2006200734 A | 8/2006 | |
| JP | 2012002300 A | 1/2012 | |
| JP | 2012167757 A | 9/2012 | |
| JP | 2013244841 A | 12/2013 | |
| JP | 5796315 B2 | 10/2015 | |
| KR | 20060064917 A | 6/2006 | |
| KR | 101509600 B1 | 4/2015 | |
| KR | 20170095073 A | 8/2017 | |
| WO | 9304883 A1 | 3/1993 | |
| WO | 2011148792 A1 | 12/2011 | |
| WO | 2012028228 A2 | 3/2012 | |
| WO | 2014004118 A1 | 1/2014 | |
| WO | 2014004119 A1 | 1/2014 | |
| WO | 2014094934 A1 | 6/2014 | |
| WO | 2015153811 A1 | 10/2015 | |
| WO | 2015169530 A1 | 11/2015 | |
| WO | 2016120044 A1 | 8/2016 | |
| WO | 2017055151 A1 | 4/2017 | |

OTHER PUBLICATIONS

Collins, S., "J Dampers in Formula One—Racecar Engineering", Downloaded Apr. 18, 2023, https://www.racecar-engineering.com/articles/f1/understanding-the-j-damper/ (4 pp).

SAE International, "Michelin re-invents the wheel", Oct. 14, 2008, Downloaded Sep. 7, 2017, http://articles.sae.org/4604/ (2 pp).

Monroe Intelligent Suspension, "CVSA2/KINETIC: Low Energy For High Performance", www.monroeintelligentsuspension.com/products/cvsa2-kinetic/, Date Unknown, Downloaded Mar. 2, 2017, 2 pp.

Tenneco, "Integrated Kinetic, H2 CES System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www. porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et al., "Design and Analysis of a Double-Stator Linear-Rotary Permanent-Magnet Motor", IEEE Transactions on Applied Superconductivity, vol. 26, No. 4, Jun. 2016, (4 pp).

daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Wikipedia, "Trailing-arm suspension", https://en.wikipedia.org/wiki/Trailing-arm_suspension, downloaded Sep. 3, 2019 (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

International Search Report and Written Opinion in Intl App No. PCT/US2022/027040 mailed Jul. 5, 2022 (15 pp).

* cited by examiner

VIBRATION ABSORBER

CROSS-REFERENCE TO RELATED APPLICATION(S)

This application claims priority to and the benefit of U.S. Provisional Patent Application No. 63/351,070, filed Jun. 10, 2022, the entire disclosure of which is incorporated by reference herein.

FIELD

The present disclosure relates generally to the field of vibration absorption.

BACKGROUND

A vibration absorption system reduces the transmission of vibrations between two components, typically a sprung mass and an unsprung mass. The tuned mass damper reduces the effects of vibration.

SUMMARY

One aspect of the disclosure is a tuned mass damper. The tuned mass damper includes a damper mass including a first mass portion and a second mass portion connected by a third mass portion. The first mass portion, the second mass portion, and the third mass portion form a U-shaped configuration of the damper mass. The damper mass is configured to separate within the third mass portion in response to a force transferred to the damper mass of the tuned mass damper to allow relative motion between the first mass portion and the second mass portion.

In some implementations of the tuned mass damper, the third mass portion is thinner in a lateral direction than the first mass portion and the second mass portion.

In some implementations of the tuned mass damper, the damper mass includes a portion of stress concentration within the third mass portion such that the third mass portion is configured to separate within the portion of stress concentration in response to the force transferred to the damper mass of the tuned mass damper to allow relative motion between the first mass portion and the second mass portion.

In some implementations of the tuned mass damper, the first mass portion is larger and has a greater mass than the second mass portion.

In some implementations of the tuned mass damper, the first mass portion has a first curved surface defined at a first end of the damper mass facing a first direction away from the second mass portion and the second mass portion has a second curved surface defined at a second end of the damper mass facing in a second and opposite direction away from the first mass portion, and the force transferred to the damper mass is applied at the first curved surface of the first mass portion and causes rotation of the damper mass.

In some implementations of the tuned mass damper, the force transferred to the damper mass includes a first force applied at the first curved surface of the damper mass and a second force applied at the second curved surface of the damper mass to induce rotation of the tuned mass damper.

In some implementations of the tuned mass damper, the tuned mass damper further includes a first spring and fluid-operated damper assembly that is configured to regulate motion of the damper mass with respect to an external portion and a second spring and fluid-operated damper assembly that is configured to regulate motion of the damper mass with respect to the external portion. The first mass portion includes a first bore and the second mass portion includes a second bore. The first spring and fluid-operated damper assembly extends at least partially through the first bore in the first mass portion and the second spring and fluid-operated damper assembly extends at least partially through the second bore in the second mass portion.

In another aspect of the disclosure, a vehicle assembly includes a brake system including a rotor connected to a wheel assembly that includes a wheel and a caliper coupled to a wheel support and configured to apply a braking force to the rotor. The vehicle assembly also includes a tuned mass damper coupled to the wheel support. The tuned mass damper includes a damper mass including a first mass portion, a second mass portion, and a third mass portion extending between the first mass portion and the second mass portion. The caliper is positioned relative to the damper mass such that the third mass portion of the damper mass is diametrically opposite the caliper. The first mass portion has a first curved surface at a first end of the damper mass facing a first direction away from the second mass portion and the second mass portion has a second curved surface at a second end of the damper mass facing in a second and opposite direction away from the first mass portion. A force applied at the first curved surface of the first mass portion causes rotation of the first mass portion and the second mass portion.

In some implementations of the vehicle assembly, the first mass portion, the second mass portion, and the third mass portion of the damper mass form a U-shaped configuration of the damper mass.

In some implementations of the vehicle assembly, the vehicle assembly further includes a first engagement portion coupled to a vehicle body such that a force applied to the vehicle body causes the first engagement portion to transfer the force applied to the vehicle body to the first mass portion of the damper mass such that the tuned mass damper and the wheel assembly rotate relative to a longitudinal axis of the vehicle body.

In some implementations of the vehicle assembly, the vehicle assembly further includes a second engagement portion coupled to the vehicle body such that the force applied to the vehicle body causes the second engagement portion to transfer the force applied to the vehicle body to the second mass portion of the damper mass such that the first engagement portion and the second engagement portion cooperatively rotate the wheel assembly from a first position to a rotated position relative to the longitudinal axis of the vehicle body.

In some implementations of the vehicle assembly, a first position of the caliper is an upward position relative to the wheel support such that the caliper is above an axis of rotation of the wheel assembly and a second position of the damper mass is a downward position relative to the wheel support such that the third mass portion is diametrically opposite from the caliper relative to the axis of rotation of the wheel assembly.

In some implementations of the vehicle assembly, a first position of the caliper is a bottom position relative to the wheel support and a second position of the damper mass is a top position relative to the wheel support.

In some implementations of the vehicle assembly, the third mass portion includes a portion of stress concentration for the force applied at the first mass portion of the damper mass.

Another aspect of the disclosure is a vibration absorption system. The vibration absorption system includes a damper mass coupled to a wheel assembly and including a first mass portion and a second mass portion connected by a third mass portion and an engagement portion coupled to a vehicle body and extending toward the wheel assembly. The engagement portion has a geometric configuration that is configured to induce rotation of the wheel assembly away from a longitudinal axis of the vehicle during an impact to the vehicle body by interaction of the engagement portion with the damper mass.

In some implementations of the vibration absorption system, the third mass portion is thinner in a lateral direction than the first mass portion and the second mass portion such that the third mass portion includes a portion of stress concentration such that the third mass portion is configured to separate within the portion of stress concentration in response to the impact to allow relative motion between the first mass portion and the second mass portion.

In some implementations of the vibration absorption system, the engagement portion is a geometric feature of the vehicle body that extends toward the wheel assembly.

In some implementations of the vibration absorption system, the vehicle further includes a second engagement portion extending from the vehicle body. The second engagement portion functions as a reaction surface for the impact to the vehicle body such that the interaction between the second engagement portion and the second mass portion of the damper mass rotates the wheel assembly away from the longitudinal axis of the vehicle.

In some implementations of the vibration absorption system, the engagement portion is a first engagement portion positioned forward of the wheel assembly and the second engagement portion is positioned rearward of the wheel assembly such that the first engagement portion and the second engagement portion cooperatively induce outward rotation of the wheel assembly upon a frontal force applied to the vehicle body.

In some implementations of the vibration absorption system, the first mass portion has a first curved surface at a first end of the damper mass facing laterally inward relative to a lateral axis of the vehicle body, the second mass portion has a second curved surface facing laterally outward relative to the lateral axis of the vehicle body, and the impact causes interaction between the engagement portion and the first curved surface to rotate the damper mass.

DETAILED DESCRIPTION

A tuned mass damper can be used to reduce unwanted vibration effects, such as wheel hop, which may be transmitted to a vehicle body. The tuned mass damper includes a damper mass coupled to a wheel assembly. The damper mass is smaller than the mass of a primary mass, such as the vehicle body, and oscillates to counter vibrations experienced by the wheel assembly. The oscillations of the damper mass result in a reduction of unwanted vibration effects.

The tuned mass damper systems, included as part of a vehicle suspension system, include a damper mass that is coupled to an unsprung mass of the vehicle, such as a suspension knuckle (e.g., a hub retainer or wheel support) or vehicle wheel assembly. The damper mass of the tuned mass damper system is shaped such that a frontal force applied to the vehicle body, such as a side overlap impact, is transferred from the vehicle body to the damper mass by one or more engagement portions. The damper mass receives the transmitted force on one or more curved surfaces such that the damper mass and the attached wheel assembly rotate away from a longitudinal axis of the vehicle body. Throughout this disclosure, the same or similar reference numbers refer to the same or similar components.

Figure 1:
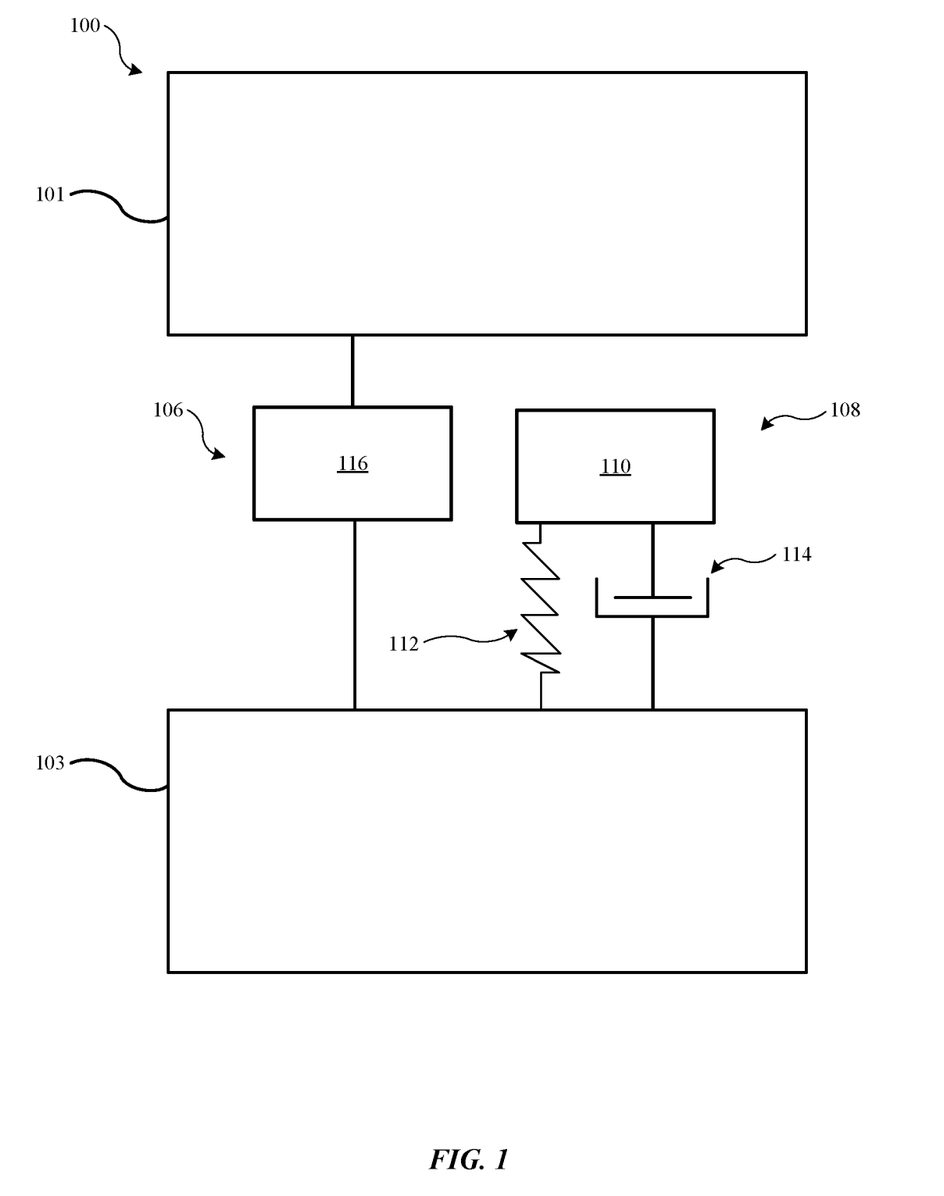
FIG. 1 is a block diagram of a vehicle that includes a tuned mass damper system.

FIG. 1 is a schematic block diagram of a vehicle assembly 100 that includes a suspension system 106. A sprung mass 101 is coupled to an unsprung mass 103 with the suspension system 106. The sprung mass 101 may include a vehicle body, unibody, frame, and/or related components. The unsprung mass 103 may be a vehicle wheel assembly that includes, for example, a wheel, a tire, a wheel hub, a suspension knuckle, and friction braking components. The suspension system 106 includes a suspension component 116 that supports and/or regulates motion of the sprung mass 101 relative to the unsprung mass 103. The suspension component 116 may be a shock absorber, a spring, or a strut and may be one component of the suspension system 106 of the vehicle assembly 100.

The vehicle assembly 100 also includes a tuned mass damper system 108 (e.g., a vibration absorption system) coupled to the unsprung mass 103. The tuned mass damper system 108 includes a damper mass 110, a spring 112, and a fluid-operated damper 114. The tuned mass damper system 108, or wheel hop damper, is a passive device that is configured to reduce vibration of an external portion to which it is mounted, such as the unsprung mass 103. In the illustrated implementation shown in FIG. 1, the tuned mass damper system 108 is connected to the unsprung mass 103. The damper mass 110 moves with respect to and in response to movement of the unsprung mass 103. Selection of dynamic properties of the spring 112 and the fluid-operated damper 114 can tune the movement of the damper mass 110. The tuned movement of the damper mass 110 is regulated by the spring 112 and the fluid-operated damper 114 to counter vibration of the unsprung mass 103. The spring 112 is connected to the damper mass 110 and the unsprung mass 103 to resist motion of the damper mass 110 away from a neutral position with respect to the unsprung mass 103. The spring 112 also acts to bias the damper mass 110 toward the neutral position with respect to the unsprung mass 103. The neutral position of the damper mass 110 is a rest position with respect to the unsprung mass 103. The damper mass 110 will be located at the neutral position absent application of an external force to the unsprung mass 103. The spring 112 supports the damper mass 110 so that the damper mass 110 can move in two directions with respect to the neutral position (e.g., positive and negative displacements with respect to an axis). The fluid-operated damper 114 is connected to the damper mass 110 and the unsprung mass 103 to resist movement of the damper mass 110 with respect to the unsprung mass 103 (e.g., by resisting movements toward and away from the neutral position).

Figure 2A:
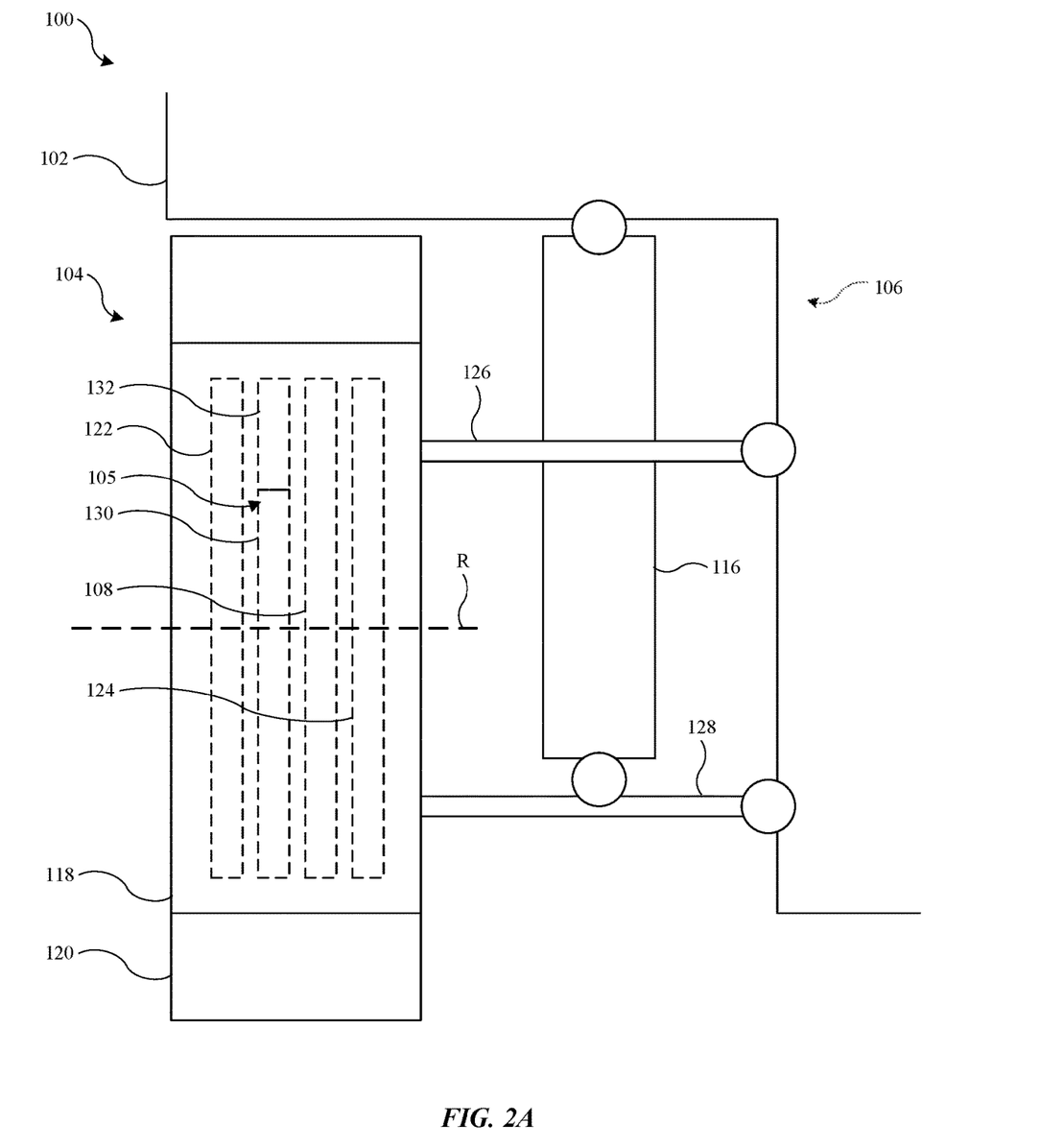
FIG. 2A is a block diagram that illustrates a portion of a vehicle, according to an implementation.
Figure 2B:
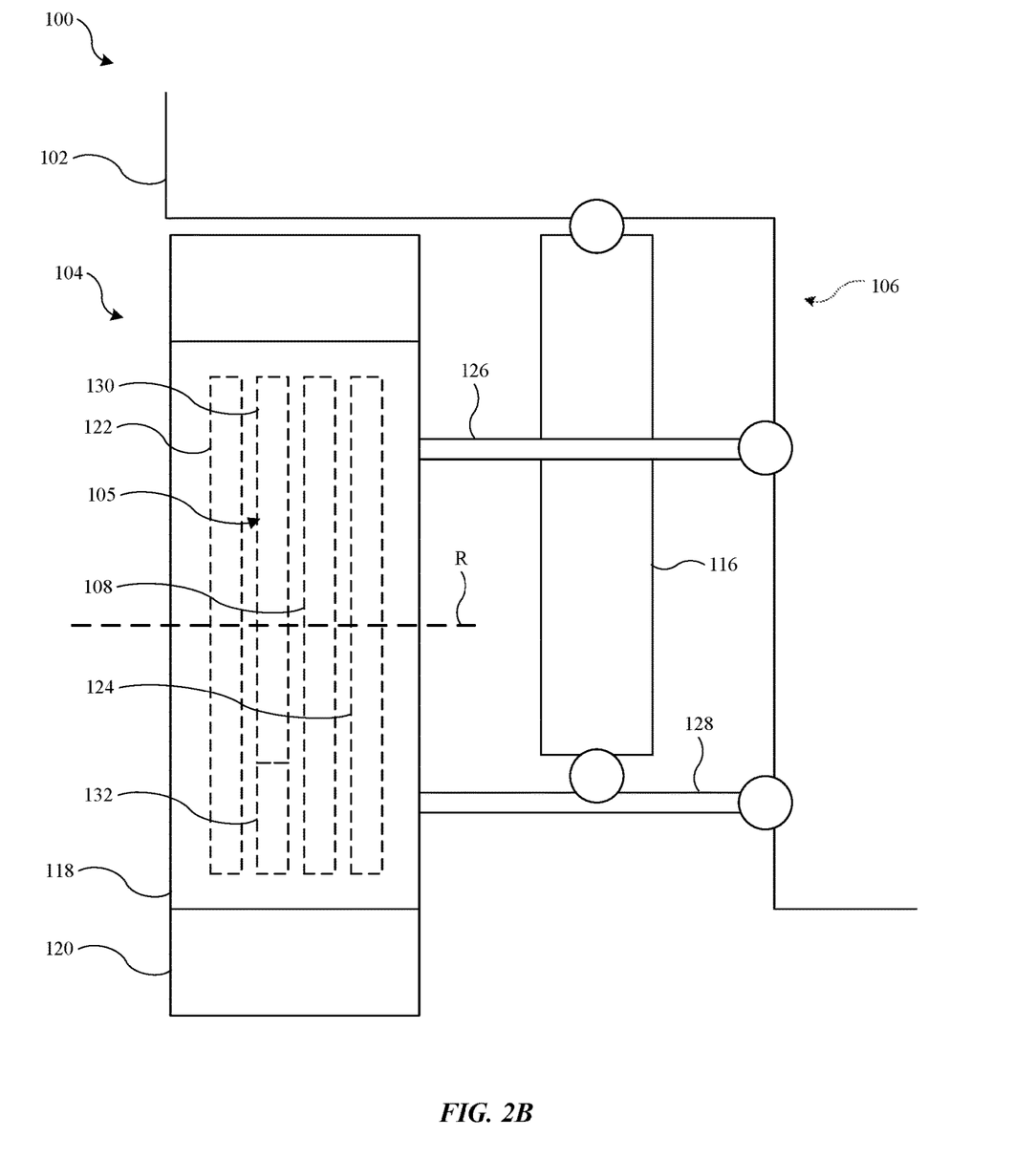
FIG. 2B is a block diagram that illustrates a portion of a vehicle, according to an implementation.

With reference to FIGS. 2A and 2B, a portion of the vehicle assembly 100 is schematically illustrated. The vehicle assembly 100 may be a conventional road-traveling vehicle such as an automobile, SUV, truck, etc. that is supported by two or more wheel assemblies that each include a wheel and a tire. As an example, the vehicle assembly 100 may be a passenger vehicle. In another example, the vehicle assembly 100 may be a cargo vehicle. In yet another example, the vehicle assembly 100 may be any vehicle such as an airplane, etc. that includes a wheel assembly and for which reduced wheel hop is desired.

In the implementation shown in FIGS. 2A and 2B, the vehicle assembly 100 includes a vehicle body 102, a wheel assembly 104, a brake system 105 that includes a rotor 130 and a caliper 132, the suspension system 106, and the tuned mass damper system 108. The vehicle body 102 includes components that are part of the sprung mass 101 of the vehicle assembly 100. In various implementations, the vehicle body 102 may be a multi-part structure or a unibody structure. The vehicle body 102 includes, in some implementations, a frame, a subframe, a body, a monocoque, and/or other types of vehicle frame and body structures. Various support components such as frame rails, structural pillars, etc. that define internal structural aspects of the vehicle assembly 100 are also included as part of the vehicle body 102. Additionally, external body panels or other external portions of the vehicle are part of the vehicle body 102.

The wheel assembly 104 includes a wheel 118, a tire 120, and a wheel hub 122 and each of the wheel 118, the tire 120, and the wheel hub 122 are conventional components. The wheel 118, in some implementations, is a steel or aluminum wheel that supports the tire 120, which may be a pneumatic tire. The wheel hub 122 is an interface between non-rotating components of the suspension system 106 of the vehicle assembly 100 and rotating components, such as the wheel 118 and the tire 120.

The suspension system 106 includes, in some implementations, the suspension component 116, a suspension knuckle 124 (e.g., a hub retainer or wheel support), an upper control arm 126, and a lower control arm 128. The suspension knuckle 124 is located at least partially inside an internal space of the wheel 118 and serves as a support structure for components of the wheel assembly 104 and the brake system 105. The suspension knuckle 124 is connected to the wheel hub 122 and supports the wheel 118 and the tire 120 to allow the wheel 118 and the tire 120 to rotate with respect to the suspension knuckle 124. The suspension knuckle 124 is also connected to non-rotating components of the brake system 105, such as the caliper 132. Rotating components of the brake system 105, such as the rotor 130, are connected to the wheel hub 122 and/or the wheel 118.

The upper control arm 126 and the lower control arm 128 connect the suspension knuckle 124 to the vehicle body 102. The suspension knuckle 124 is movable relative to the vehicle body 102, primarily in a generally vertical direction (e.g., generally perpendicular to the direction of travel of the vehicle). In one example, the upper control arm 126 and the lower control arm 128 are each connected to the vehicle body 102 and to the suspension knuckle 124 by pivot joints that allow rotation in one or more rotational degrees of freedom. The suspension component 116 is a suspension damper that is configured to regulate motion of the wheel assembly 104 with respect to the vehicle body 102. In various implementations, the suspension component 116 is a shock, a strut, a spring, a linear actuator, or other active suspension component or passive suspension component.

The brake system 105 provides deceleration torque for decelerating the vehicle assembly 100 using friction brake components, such as the rotor 130 and the caliper 132. The caliper 132 is configured to apply a braking force to the rotor 130. In the implementation shown in FIG. 2A, the caliper 132 is positioned at the top of the rotor 130 and above an axis of rotation R of the wheel 118 and the tire 120. In the implementation shown in FIG. 2B, the caliper 132 is positioned at the bottom of the rotor 130 and below the axis of rotation R of the wheel 118 and the tire 120. The position of the caliper 132 corresponds to the open end of the damper mass 110 of the tuned mass damper system 108. For example, the damper mass 110 may be positioned below the caliper 132 in the implementation shown in FIG. 2A, and the damper mass 110 may be positioned above the caliper 132 in the implementation shown in FIG. 2B. The position of the damper mass 110 is shown in FIGS. 3 and 4.

The tuned mass damper system 108 is a passive suspension component that is part of the suspension system 106 of the vehicle assembly 100. The tuned mass damper system 108 is configured to damp vibration of the wheel assembly 104, such as, for example, reducing the occurrence of wheel hop. The tuned mass damper system 108 damps vibration of the wheel assembly 104 by regulating movement of the damper mass 110. By damping vibration of the wheel assembly 104, the tuned mass damper system 108 can reduce a transmission of vibration from the unsprung mass 103 to the sprung mass 101 of the vehicle assembly 100.

Figure 3:
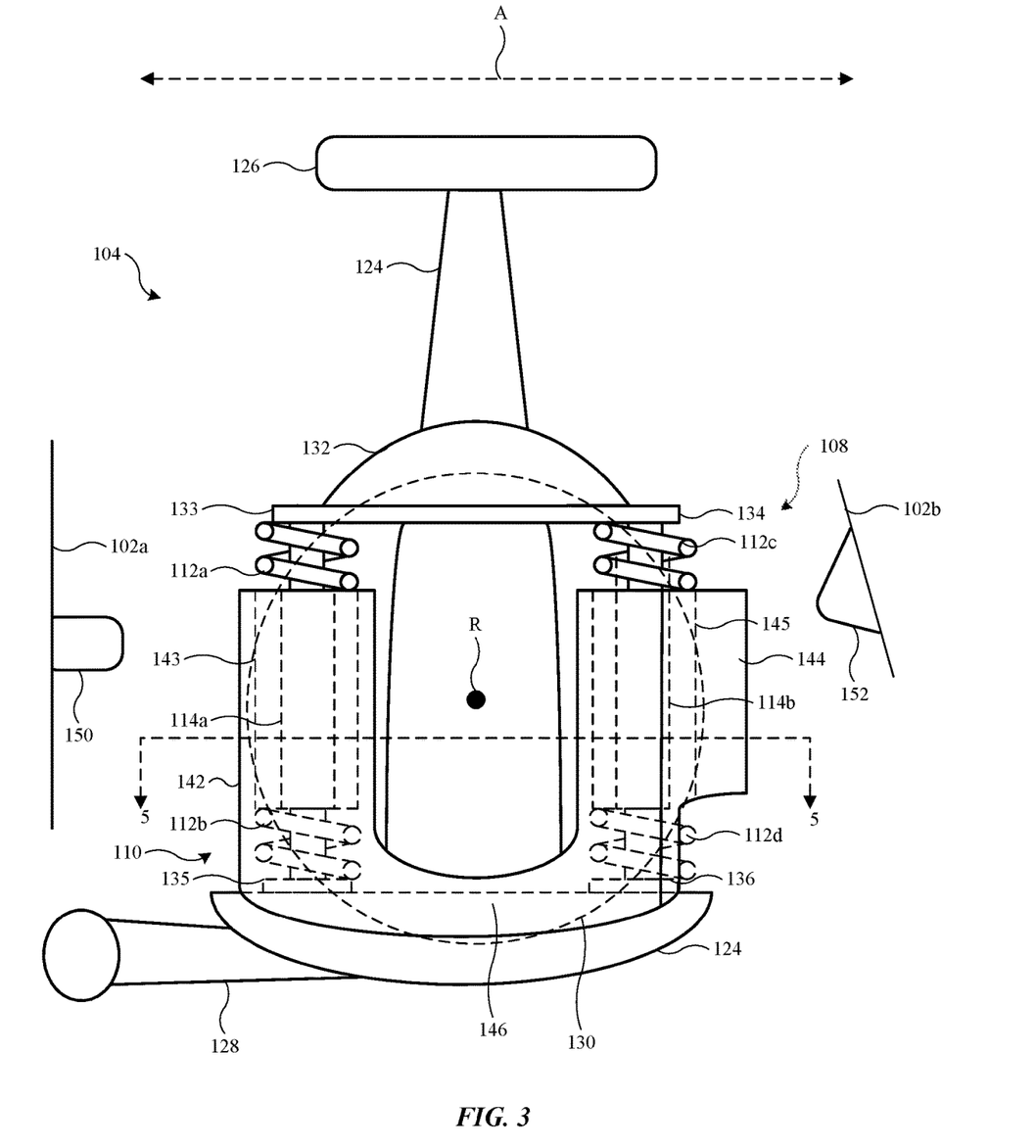
FIG. 3 is a schematic side view illustration of a wheel assembly for a vehicle, according to an implementation.
Figure 4:
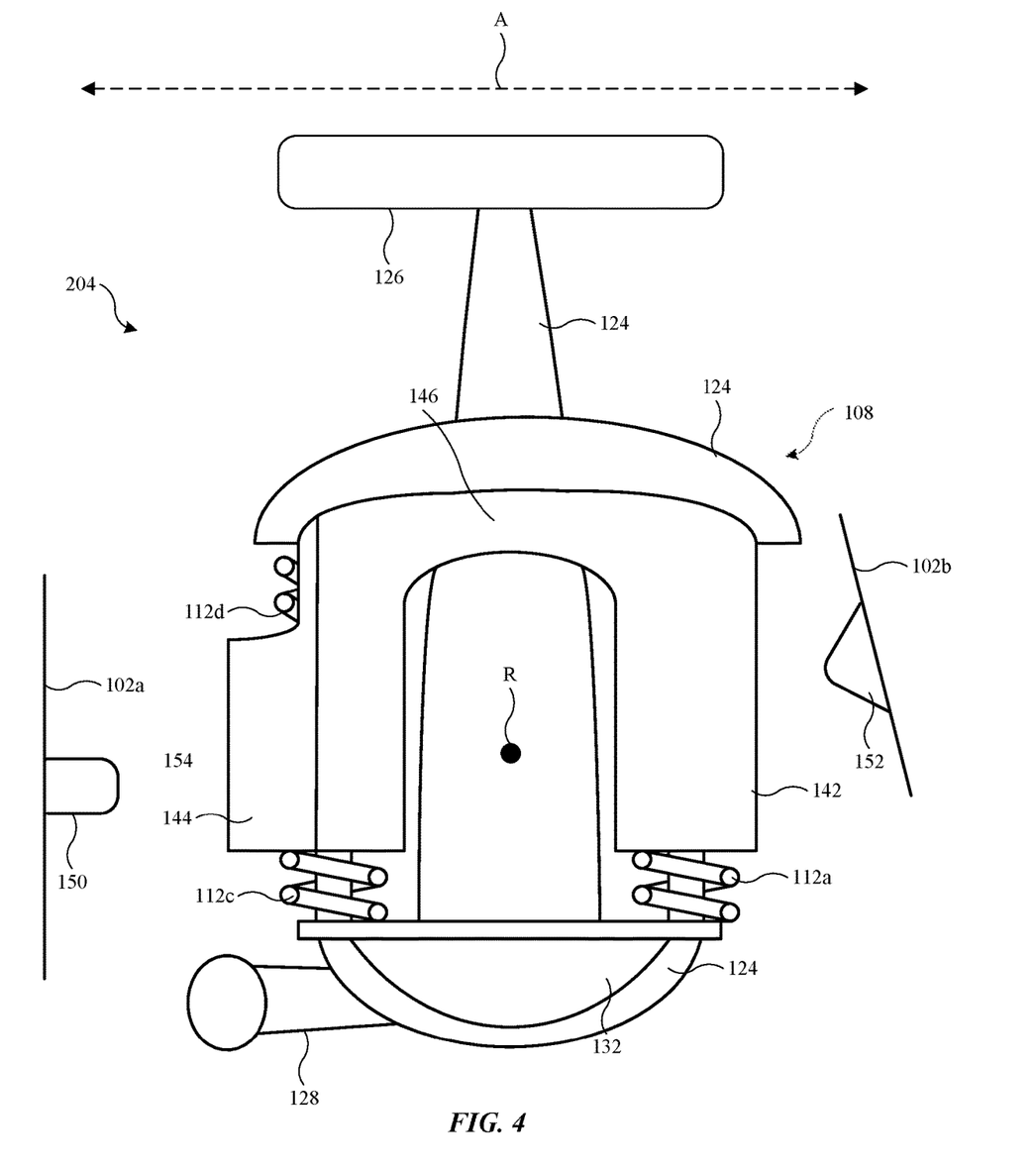
FIG. 4 is a schematic side view illustration of a wheel assembly for a vehicle, according to another implementation.

FIG. 3 schematically illustrates a side view of the wheel assembly 104. The suspension knuckle 124 connects the upper control arm 126 and the lower control arm 128. The suspension knuckle 124 is also a support structure for the tuned mass damper system 108 and rotating and non-rotating components of the brake system 105, including the caliper 132 and the rotor 130.

In the illustrated implementation, the tuned mass damper system 108 includes the damper mass 110, first spring 112a, second spring 112b, third spring 112c, fourth spring 112d, first fluid-operated damper 114a, and second fluid-operated damper 114b. The damper mass 110 has a first mass portion 142, a second mass portion 144, and a third mass portion 146 that connects the first mass portion 142 and the second mass portion 144. The first mass portion 142, the second mass portion 144, and the third mass portion 146 are geometric features of the tuned mass damper system 108 that promote rotation of the damper mass 110 relative to a longitudinal axis of the vehicle when the vehicle is subjected to impact loads.

The first mass portion 142 includes a first bore 143 that extends generally vertically (e.g., perpendicular to the direction of travel of the vehicle) through the first mass portion 142. The first fluid-operated damper 114a is located within the first bore 143. The first spring 112a and the second spring 112b are mounted coaxially with the first fluid-operated damper 114a. The first spring 112a, the second spring 112b and the first fluid-operated damper 114a extend through the first bore 143. The first spring 112a extends from a first top mount 133 to an upper shoulder of the first bore 143. The second spring 112b extends from a lower shoulder of the first bore 143 to a first bottom mount 135. The upper shoulder of the first bore 143 and the lower shoulder of the first bore 143 act as bearing surfaces for the first spring 112a and the second spring 112b, respectively. The first spring 112a and the second spring 112b surround the first fluid-operated damper 114a and are configured to bias the damper mass 110

(i.e., a moving mass) toward a neutral or rest position of the damper mass 110 with respect to the external portion (e.g., the suspension knuckle 124 or other component of the unsprung mass 103) by acting against the bearing surfaces of the first shoulder and the second shoulder of the first bore 143, the first top mount 133, and the first bottom mount 135. The neutral position is a rest position for the damper mass 110 with respect to the suspension knuckle 124. The damper mass 110 will be located at the rest position absent application of an external force to the external portion (e.g., the suspension knuckle 124). The first fluid-operated damper 114a is configured to regulate motion of the damper mass 110 with respect to the external portion by movement of a fluid between first and second fluid chambers of the first fluid-operated damper 114a. The first fluid-operated damper 114a, the first spring 112a, and the second spring 112b define a first spring and fluid-operated damper assembly that extends at least partially through the first bore 143 in the first mass portion 142 of the damper mass 110 and is configured to regulate motion of the damper mass 110 with respect to an external portion, such as the suspension knuckle 124.

Similarly, the second mass portion 144 includes a second bore 145. The second bore 145 extends generally vertically through the second mass portion 144. The second fluid-operated damper 114b is located within the second bore 145. The third spring 112c and the fourth spring 112d are mounted coaxially with the second fluid-operated damper 114b. The third spring 112c, the fourth spring 112d, and the second fluid-operated damper 114b extend through the second bore 145. The third spring 112c extends from a second top mount 134 to an upper shoulder of the second bore 145. The fourth spring 112d extends from a lower shoulder of the second bore 145 to a second bottom mount 136. The upper shoulder of the second bore 145 and the lower shoulder of the second bore 145 act as bearing surfaces for the third spring 112c and the fourth spring 112d, respectively. The third spring 112c and the fourth spring 112d surround the second fluid-operated damper 114b are configured to bias the damper mass 110 toward the neutral position of the damper mass 110 relative to the externa structure by acting against the upper and lower bearing surfaces of the second bore 145, the second top mount 134 and the second bottom mount 136. The second fluid-operated damper 114b is configured to regulate motion of the damper mass 110 with respect to the external portion by movement of a fluid between first and second fluid chambers of the second fluid-operated damper 114b. The second fluid-operated damper 114b, the third spring 112c, and the fourth spring 112d define a second spring and fluid-operated damper assembly that extends at least partially through the second bore 145 in the second mass portion 144 and is configured to regulate motion of the damper mass 110 with respect to an external portion, such as the suspension knuckle 124.

The third mass portion 146 connects the first mass portion 142 and the second mass portion 144 such that the first mass portion 142, the second mass portion 144, and the third mass portion 146 form a compact, U-shaped configuration of the damper mass 110 that minimizes the stack of hardware components in the wheel assembly 104. The third mass portion 146 forms a bottom of the U-shape with an open end opposite the third mass portion 146. In various implementations the first mass portion 142 has a different shape and size than the second mass portion 144, that is, the first mass portion 142 is larger and has a greater mass than the second mass portion 144. In the implementation illustrated in FIG. 3, the first mass portion 142 is disposed forward of the second mass portion 144 relative to a longitudinal axis A of the vehicle assembly 100. As shown in FIG. 3, the first mass portion 142 is positioned forward of the axis of rotation R of the rotating components of the wheel assembly 104 and the second mass portion 144 is positioned rearward of the axis of rotation R of the rotating components of the wheel assembly 104. The third mass portion 146 is positioned below the axis of rotation R in FIG. 3. In various implementations, the first mass portion 142, the second mass portion 144, and the third mass portion 146 are unitarily formed from a stiff and dense material, such as a metal, so that the damper mass 110 has a mass that is sufficient to counteract vibrations experienced by the wheel assembly 104. While the implementation illustrated in FIG. 3 shows the damper mass 110 as having a U-shaped configuration, it is understood that the damper mass may be formed in other configurations that preserve the position of the first mass portion 142 and the second mass portion 144 on opposite sides of the axis of rotation R of the rotating components of the wheel assembly 104 (e.g., the first mass portion 142 positioned forward of the axis of rotation R and the second mass portion 144 positioned rearward of the axis of rotation R) to facilitate the motion of the first mass portion 142 relative to the second mass portion 144 in response to an applied force to the vehicle body 102.

With continued reference to FIG. 3, the wheel assembly 104 is disposed in a wheel opening defined in the vehicle body 102. The vehicle body 102 includes a first vehicle body portion 102a located forward of the wheel assembly 104 relative to the forward direction of travel of the vehicle and a second vehicle body portion 102b located rearward of the wheel assembly 104 relative to the forward direction of travel of the vehicle. The first vehicle body portion 102a is, in some implementations, a bumper or a forward portion of a wheel well. The first vehicle body portion 102a includes a first engagement portion 150. The first engagement portion 150 is a geometric feature coupled to or extruded from the vehicle body 102 that extends from the vehicle body 102 such that a force applied to the vehicle body 102 causes the first engagement portion 150 to transfer the force applied to the vehicle body 102 to the first mass portion 142 of the damper mass 110. As a result of the force transferred to the first mass portion 142 of the damper mass 110, the tuned mass damper system 108 and the wheel assembly 104 rotate relative to the longitudinal axis of the vehicle body 102. Prior to an impact event, the tuned mass damper system 108 is a non-rotated and non-rotating component of the vehicle assembly 100 (e.g., the tuned mass damper system 108 does not rotate relative to a longitudinal axis of the vehicle). The force applied to the vehicle body 102 may be a side offset impact force such that the force transferred to the first mass portion 142 of the damper mass 110 causes the wheel assembly 104 and the tuned mass damper system 108 to rotate outward (i.e., the front of the wheel assembly 104 rotates away from the longitudinal axis of the vehicle body 102). The first engagement portion 150 is configured to induce rotation of the wheel assembly 104 and the tuned mass damper system 108 during an impact event by interaction with the damper mass 110. Interaction includes the transfer of the force applied to the vehicle body 102 through intervening structures between the first engagement portion 150 and the damper mass 110 of the tuned mass damper system 108 (e.g., during deformation and/or breakage of the intervening structures). The intervening structures include components of the wheel assembly 104 such as the wheel 118 and the tire 120.

The second vehicle body portion 102b is located rearward of the wheel assembly 104 relative to a forward direction of travel of the vehicle and is, in some implementations, a rear portion of a wheel well enclosure of the vehicle body 102. In some implementations, a second engagement portion 152 is coupled to the second vehicle body portion 102*b*. The second engagement portion 152 is a geometric feature coupled to or extruded from the vehicle body 102 that extends from the vehicle body 102 such that the force applied to the vehicle body 102 causes the second engagement portion 152 to transfer the force applied to the vehicle body 102 to the second mass portion 144 of the damper mass 110. The second engagement portion 152 is configured to induce rotation of the wheel assembly 104 and the tuned mass damper system 108 during the impact event by interaction with the damper mass 110. Interaction includes the transfer of the force applied to the vehicle body 102 through intervening structures between the second engagement portion 152 and the damper mass 110 of the tuned mass damper system 108 (e.g., during deformation and/or breakage of the intervening structures). The intervening structures include components of the wheel assembly 104 such as the wheel 118 and the tire 120. In various implementations, the first engagement portion 150 and the second engagement portion 152 are portions of the tuned mass damper system 108 that cooperatively or together induce outward rotation of the wheel assembly 104 and the tuned mass damper system 108 and cooperatively rotate the wheel assembly 104 from a first position (shown in FIG. 5) to an outwardly rotated position (shown in FIG. 6) upon a frontal force applied to the vehicle body 102. The rotation of the tuned mass damper system 108 results in rotation of the damper mass 110.

In the illustrated implementation, the caliper 132 is positioned relative to the damper mass 110 such that the third mass portion 146 of the damper mass 110 is diametrically opposite the caliper 132 relative to the axis of rotation R of the wheel assembly 104. In various implementations, the caliper 132 is positioned relative to the damper mass 110 such that the third mass portion 146 of the damper mass 110 is generally opposite the caliper 132 in a radial direction and is positioned on an opposite side of the axis of rotation R of the wheel assembly 104. As shown in FIG. 4, the caliper 132 is in a first position that is an upward position relative to the suspension knuckle 124 and the caliper 132 is above the axis of rotation R of the wheel assembly 104. The damper mass 110 is in a second position that is a downward position relative to the suspension knuckle 124 such that the third mass portion 146 of the damper mass 110 is opposite from the caliper 132 and below the axis of rotation R of the wheel assembly 104, e.g., the damper mass 110 does not move relative to an external portion, such as the suspension knuckle 124. In various implementations, as shown in FIG. 4, the caliper 132 is positioned between the first top mount 133 and the second top mount 134.

Figure 5:
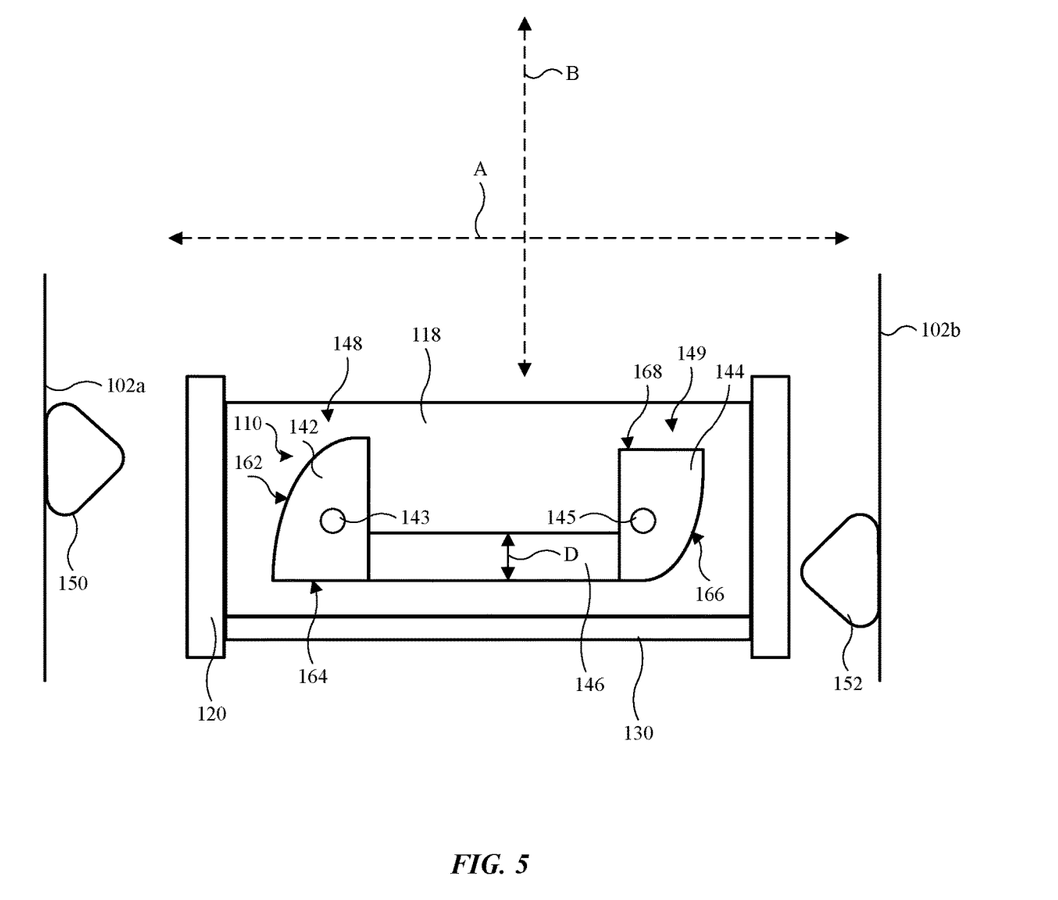
FIG. 5 is a schematic cross-sectional illustration of the wheel assembly of FIG. 3.

In various implementations, as illustrated in FIG. 5, a wheel assembly 204 includes the caliper 132 and the damper mass 110 in positions opposite the positions of these components shown in FIG. 4. In this implementation, the caliper 132 is positioned at a bottom position relative to the suspension knuckle 124 and below the axis of rotation R of the wheel assembly 104. The third mass portion 146 of the damper mass 110 is positioned at a top position relative to the suspension knuckle 124 and above the axis of rotation R of the wheel assembly 104. In the illustrated implementation in FIG. 5, the damper mass 110 is positioned in an upside-down U-shape such that the third mass portion 146 is above the caliper 132.

As shown in FIG. 5, the damper mass 110 is oriented such that the second mass portion 144 is forward of the first mass portion 142, that is, the second mass portion 144 is forward of the axis of rotation R of the wheel assembly 104 and the first mass portion 142 is rearward of the axis of rotation R of the wheel assembly 104. In other configurations, the damper mass 110 is oriented as shown in FIG. 4 with the first mass portion 142 forward of the second mass portion 144 relative to the longitudinal axis A of the vehicle, that is, the first mass portion 142 is forward of the axis of rotation R of the wheel assembly 104 and the second mass portion 144 is rearward of the axis of rotation R of the wheel assembly while the third mass portion 146 is below the axis of rotation R of the wheel assembly. In the illustrated configuration, the first engagement portion 150 transfers an impact force to the wheel assembly 204 and through deformation and/or breakage of components of the wheel assembly 204 to the second mass portion 144 of the damper mass 110. The second engagement portion 152 transfers the impact force to the wheel assembly 204 and the first mass portion 142 of the damper mass 110. The first engagement portion 150 and the second engagement portion 152 cooperatively act to rotate the wheel assembly 204 away from the longitudinal axis of the vehicle assembly 100, that is to rotate the wheel assembly 204 outward and away from the longitudinal axis of the vehicle assembly 100.

With reference now to FIG. 5, the wheel assembly 104 is shown in cross-section. The wheel assembly 104 includes the wheel 118 and the tire 120, as well as a wheel hub (not shown) that acts as the interface between non-rotating components of the suspension system 106 of the vehicle assembly 100 and rotating components, such as the wheel 118 and the tire 120. A rotor 130 is connected to the wheel 118 for rotation with the wheel 118 (e.g., the rotor rotates in unison with the wheel 118).

The damper mass 110 includes the first mass portion 142, the second mass portion 144, and the third mass portion 146. The third mass portion 146 extends between the first mass portion 142 and the second mass portion 144 and connects the first mass portion 142 and the second mass portion 144.

The first mass portion 142 has a first curved surface 162 defined at a first end 148 of the damper mass 110. The first curved surface 162 faces a first direction, which is a forward direction as illustrated in FIG. 5, and the first direction is away from the second mass portion 144. The first curved surface 162 also faces laterally inward relative to a lateral axis B of the vehicle body 102. The first curved surface 162 extends vertically, that is, in a plane perpendicular to a lateral direction of the vehicle body 102, from the open end of the damper mass 110 to the third mass portion 146 that forms the closed end, or bottom of the U-shaped configuration, of the damper mass 110. This orientation of the first curved surface 162 of the first mass portion 142 induces rotation of the damper mass 110 and the wheel assembly 104 when the first curved surface 162 receives the force applied to the vehicle body 102 that is transferred through the first engagement portion 150 and the deformation and/or breakage of intervening components of the wheel assembly 104. The first engagement portion 150 has a geometric configuration that is designed to interact, through the intervening components of the wheel assembly 104, with the first curved surface 162 and rotate the first mass portion 142 laterally outward. The geometric configuration of the first engagement portion 150 is a configuration that directs the force applied to the vehicle body 102 to the area on the first curved surface 162 that induces lateral outward rotation of the first mass portion 142 of the damper mass 110. The first curved surface 162 is configured to receive a force applied to the vehicle body 102, such as during a small overlap impact where impact forces are concentrated on a front corner of the vehicle body 102 and rotate the connected wheel assembly 104 outward relative to the longitudinal axis A of the vehicle body 102. The force from the impact event is transferred through the first engagement portion 150 and through the crushable components of the wheel assembly 104 to the damper mass 110 such that the transferred force is applied at an area on the first curved surface 162 to rotate the wheel assembly 104 and tuned mass damper system 108 in a first or outward direction away from a center of the vehicle body 102. The force transferred to the damper mass 110 is applied at the first curved surface 162 of the first mass portion 142 and causes rotation between the first mass portion 142 and the second mass portion 144, that is, the first mass portion 142 rotates relative to the second mass portion 144.

The first mass portion 142 includes a first flat surface 164 that faces the rotor 130. The first flat surface 164 is part of a side surface of the damper mass 110 and is generally planar with the third mass portion 146. The outward facing side surface partially defined by the first flat surface 164 is generally planar and is adjacent to the rotor 130.

The second mass portion 144 includes a second curved surface 166 defined at a second end 149 of the damper mass 110. The second curved surface 166 faces a second direction and opposite direction from the first direction, which is a rearward direction as illustrated in FIG. 5, and the second direction is generally away or an opposite direction from the first mass portion 142. The second curved surface 166 also faces laterally outward relative to the lateral axis B of the vehicle body 102. The second curved surface 166 extends vertically, that is, in a plane perpendicular to a lateral direction of the vehicle body 102, from the open end of the damper mass 110 toward the third mass portion 146 that forms the closed end, or bottom of the U-shaped configuration, of the damper mass 110. This orientation of the second curved surface 166 of the second mass portion 144 induces inward rotation of the damper mass 110 when the second mass portion 144 receives the force applied to the vehicle body 102 that is transferred through the second engagement portion 152 and the deformation and/or breakage of intervening components of the wheel assembly 104. The second curved surface 166 is configured to receive the force applied to the vehicle body 102, such as a force from a small overlap impact, and rotate the connected wheel assembly 104 laterally inward relative to the longitudinal axis A of the vehicle body 102. The force from the impact event is transferred through the second engagement portion 152 and through the crushable components of the wheel assembly 104 to the damper mass 110 such that the transferred force is applied at an area on the second curved surface 166 to rotate the wheel assembly 104 and the tuned mass damper system 108 in a second or laterally inward direction toward a center of the vehicle body 102. In various implementations, the force applied to the vehicle body 102 is transferred by the first engagement portion 150 through the deformable components of the wheel assembly 104 to the first curved surface 162 of the first mass portion 142. The resultant translation and/or rotation of the wheel assembly 104 and the damper mass 110 results in interaction between the second engagement portion 152 and the second curved surface 166 of the second mass portion 144 through the deformable components of the wheel assembly 104. The second mass portion 144 includes a second flat surface 168 positioned on an opposite side of the damper mass 110 away from the rotor 130. In various implementations, the curved and flat surfaces of the first mass portion 142 and the second mass portion 144 are designed for packaging and force transfer considerations.

The third mass portion 146 has a width D in a lateral direction, that is, parallel to the lateral axis B of the vehicle body 102, that is smaller than a width of the first mass portion 142 and a width of the second mass portion 144 such that the third mass portion 146 is thinner in the lateral direction than the first mass portion 142 and the second mass portion 144. In various implementations, the width D of the third mass portion 146 is thinner than a minimum lateral dimension of the first mass portion 142 and a minimum lateral dimension of the second mass portion 144. In some implementations, the width D of the third mass portion 146 is thinner than an adjacent portion of the first mass portion 142 where the first mass portion 142 meets the third mass portion 146. In some implementations, the width D of the third mass portion 146 is thinner than an adjacent portion of the second mass portion 144 where the second mass portion 144 meets the third mass portion 146. The width D is, in some embodiments, a minimum lateral dimension of the third mass portion 146 at a position that is equidistant between the first mass portion 142 and the second mass portion 144. In various implementations, the third mass portion 146 has a cross-sectional area at a position between the first mass portion 142 and the second mass portion 144 that is smaller than other positions within the third mass portion 146 in a plane that extends perpendicular to the longitudinal axis of the vehicle body 102.

The third mass portion 146 is designed to be a deformable and frangible component of the damper mass 110 such that, in the event of an impact, the damper mass 110 separates within the third mass portion 146. In one example, the damper mass 110 is configured to separate by fracturing within the third mass portion 146. The width D of the third mass portion 146 is designed to be at an area where a maximum concentration of stress resultant from the applied force results in separation of the first mass portion 142 from the second mass portion 144 such that there is relative motion between the first mass portion 142 and the second mass portion 144. Stress on the damper mass 110 from the force applied to the vehicle body 102 may be present at different points on the damper mass 110, such as, for example, the area of impact on the first curved surface 162 of the first mass portion 142 by the first engagement portion 150. However, the position within the third mass portion 146 that has a minimum cross-sectional area as compared to other the cross-sectional area of adjacent areas of the third mass portion 146 is one area of high stress concentration that can result in separation of the first mass portion 142 from the second mass portion 144 by fracture at the minimum cross-sectional area of the third mass portion 146 such that the first mass portion 142 moves relative to the second mass portion 144. The area of high stress concentration within the third mass portion 146 depends on the material selection and manufacturing process of the damper mass 110. The selection of the material and manufacturing process of the damper mass 110 is controlled such that the motion of the first mass portion 142 relative to the second mass portion 144 is achieved via separation or fracture at the minimum cross-sectional area of the third mass portion 146.

In various implementations, the first engagement portion 150 is a geometric change to the underlying structure of the vehicle body 102. The first engagement portion 150 is coupled to or formed integrally with the vehicle body 102. The first engagement portion 150 can have any shape, such as a hammer, wedge, or other protrusion configured to transfer an impact force applied to the vehicle body 102 to the wheel assembly 104 and the damper mass 110 of the tuned mass damper system 108. The first engagement portion 150 is positioned forward of the wheel assembly 104. The first engagement portion 150 may be positioned inward of a vehicle bumper or inside a wheel well enclosure such that the first engagement portion 150 is not visible from a position exterior of the vehicle body 102. The first engagement portion 150 is positioned such that the force applied to the vehicle body 102 is transferred to the area on the first curved surface 162 of the first mass portion 142 to induce outward rotation of the damper mass 110 and the attached wheel assembly 104.

Similarly, the second engagement portion 152 is a geometric change to the underlying structure of the vehicle body 102. The second engagement portion 152 is coupled to or integrally formed with the vehicle body 102. The second engagement portion 152 protrudes from the underlying structure of the vehicle body 102 toward the second mass portion 144 of the damper mass 110 and is positioned such that the force applied to the vehicle body 102 is transferred to the area on the second curved surface 166 to induce inward rotation of the damper mass 110 and the attached wheel assembly 104. The second engagement portion 152 is positioned rearward of the wheel assembly 104 and tuned mass damper system 108 and may be inside the wheel well enclosure such that the second engagement portion 152 is not visible from a position exterior of the vehicle body 102.

Figure 6:
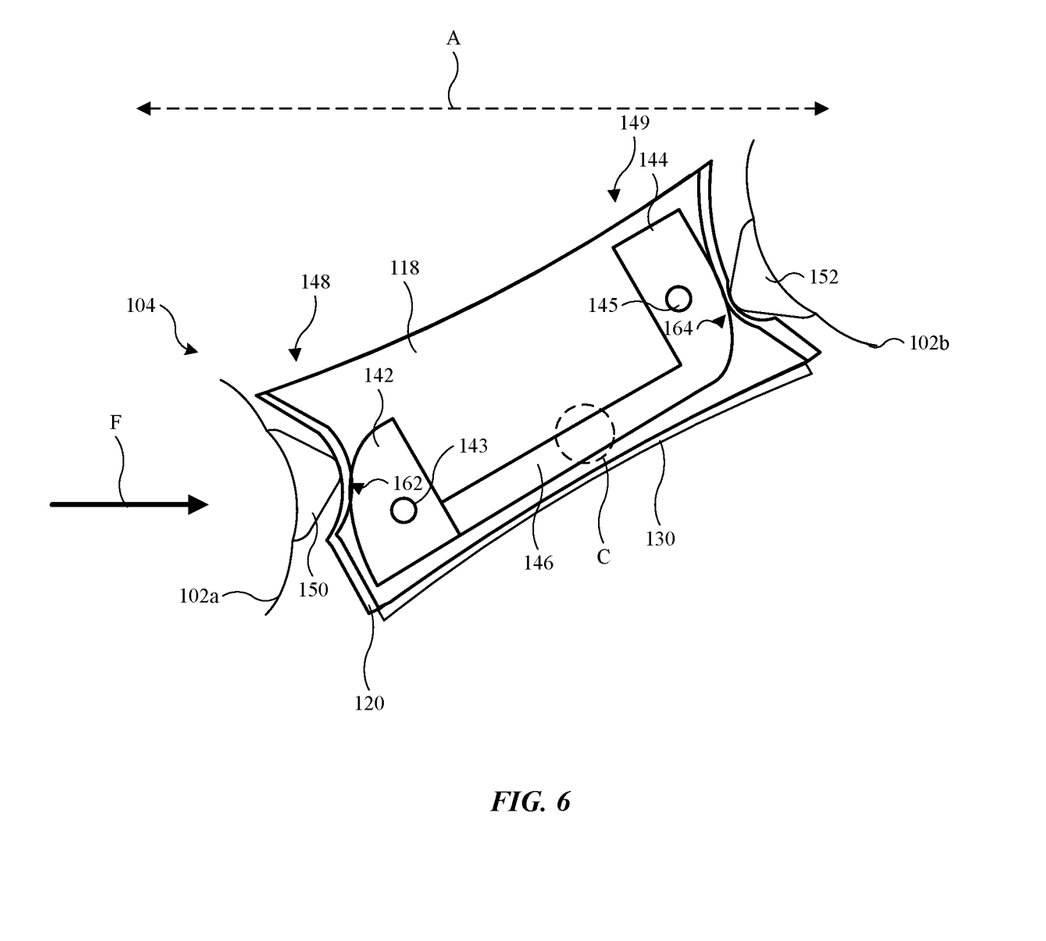
FIG. 6 is a schematic cross-sectional illustration of the wheel assembly of FIG. 3 in response to a force applied to the vehicle.

The damper mass 110 is a generally rigid, noncrushable component, in contrast to the other components of the wheel assembly 104 (e.g., the wheel 118, tire 120) that crush or deform in response to the force applied to the vehicle body 102. FIG. 6 illustrates the reaction of the wheel assembly 104 and the tuned mass damper system 108 in response to an impact force F, such as a small overlap impact, applied to a front corner of the vehicle body 102. The force F is transferred from the first engagement portion 150 to the crushable components of the wheel assembly 104 (e.g., the wheel 118 and the tire 120). The force is applied at the area on the first curved surface 162 of the first mass portion 142 to rotate the wheel assembly 104 and tuned mass damper system 108 in a generally outward direction relative to the longitudinal axis A of the vehicle body 102. The impact force F also translates the wheel assembly 104 rearward such that the second engagement portion 152 contacts the crushable components of the wheel assembly 104. The force from the second engagement portion 152 is transferred through the crushable components and is applied at the area on the second curved surface 166 to further induce rotation of the wheel assembly 104 and tuned mass damper system 108 such that the second end 149 of the damper mass 110 rotates inward and toward the longitudinal axis A of the vehicle body 102. The second engagement portion 152 may function as a reaction surface for the impact force F applied to the vehicle body 102 such that the interaction between the second engagement portion 152 and the second mass portion 144 of the damper mass 110 rotates the wheel assembly 104 away from the longitudinal axis A of the vehicle body 102.

The third mass portion 146 includes a portion of stress concentration C that is positioned anywhere within the third mass portion 146. The portion of stress concentration C is generally where the lateral width D of the third mass portion 146 (shown in FIG. 5) is a minimum width such that a fracture of the damper mass 110 due to the impact force F is likely to occur within the portion of stress concentration C of the third mass portion 146. The portion of stress concentration C is the highest area of stress concentration between part of the first mass portion 142 and the second mass portion 144. The damper mass 110 may include multiple areas of stress concentration, but separation of the first mass portion 142 from the second mass portion 144 due to fracture of the third mass portion 146 is most likely to occur at the portion of stress concentration C.

As described above, one aspect of the present technology is suspension control, which may, in some implementations, include the gathering and use of data available from various sources to customize operation based on user preferences. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores user preferences for user comfort levels with regard to, for example suspension system stiffness. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile for identifying user comfort levels and preferences, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, suspension control can be performed using non-personal information data or a bare minimum amount of personal information, other non-personal information available to the devices, or publicly available information.

What is claimed is:

1. A tuned mass damper, comprising:
    a damper mass including a first mass portion and a second mass portion connected by a third mass portion such that the first mass portion, the second mass portion, and the third mass portion form a U-shaped configuration of the damper mass,
    wherein the damper mass includes a portion of stress concentration within the third mass portion such that the third mass portion is configured to separate within the portion of stress concentration in response to a force transferred to the damper mass of the tuned mass damper to allow relative motion between the first mass portion and the second mass portion.

2. The tuned mass damper according to claim 1, wherein the third mass portion is thinner in a lateral direction than the first mass portion and the second mass portion.

3. The tuned mass damper according to claim 1, wherein the first mass portion is larger and has a greater mass than the second mass portion.

4. The tuned mass damper according to claim 1, wherein the first mass portion has a first curved surface defined at a first end of the damper mass facing a first direction away from the second mass portion and the second mass portion has a second curved surface defined at a second end of the damper mass facing in a second and opposite direction away from the first mass portion, the force transferred to the damper mass is applied at the first curved surface of the first mass portion, and the damper mass is configured to rotate in response to the force applied at the first curved surface.

5. The tuned mass damper according to claim 4, wherein the force transferred to the damper mass includes a first force applied at the first curved surface of the damper mass and a second force applied at the second curved surface of the damper mass, and the tuned mass damper is configured to rotate in response to the first force applied at the first curved surface and the second force applied at the second curved surface.

6. The tuned mass damper according to claim 1, further comprising:
    a first spring and fluid-operated damper assembly that is configured to regulate motion of the damper mass with respect to an external portion; and
    a second spring and fluid-operated damper assembly that is configured to regulate motion of the damper mass with respect to the external portion,
    wherein the first mass portion includes a first bore and the second mass portion includes a second bore, the first spring and fluid-operated damper assembly extends at least partially through the first bore in the first mass portion, and the second spring and fluid-operated damper assembly extends at least partially through the second bore in the second mass portion.

7. A vehicle assembly defining a longitudinal axis and a lateral axis that is perpendicular to the longitudinal axis, the vehicle assembly comprising:
    a brake system including a rotor connected to a wheel assembly that includes a wheel and a caliper coupled to a wheel support and configured to apply a braking force to the rotor; and
    a tuned mass damper coupled to the wheel support, the tuned mass damper comprising a damper mass including a first mass portion, a second mass portion, and a third mass portion extending between the first mass portion and the second mass portion,
    wherein the caliper is positioned relative to the damper mass such that the third mass portion of the damper mass is diametrically opposite the caliper,
    wherein the first mass portion has a first curved surface at a first end of the damper mass,
    wherein the second mass portion has a second curved surface at a second end of the damper mass that is opposite the first end,
    wherein the first curved surface includes a first portion that faces away from the second mass portion relative to the longitudinal axis and a second portion that faces inward relative to the lateral axis, and
    wherein the first mass portion and the second mass portion are configured to rotate away from the longitudinal axis in response to a force applied at the first curved surface of the first mass portion.

8. The vehicle assembly according to claim 7, wherein the first mass portion, the second mass portion, and the third mass portion of the damper mass form a U-shaped configuration of the damper mass.

9. The vehicle assembly according to claim 7, further comprising a first engagement portion coupled to a vehicle body, the first engagement portion configured to transfer a force applied to the vehicle body to the first mass portion of the damper mass such that the tuned mass damper and the wheel assembly rotate outward relative to the longitudinal axis of the vehicle assembly.

10. The vehicle assembly according to claim 9, further comprising a second engagement portion coupled to the vehicle body, the second engagement portion configured to transfer the force applied to the vehicle body to the second mass portion of the damper mass such that the first engagement portion and the second engagement portion cooperatively rotate the wheel assembly from a first position to a rotated position relative to the longitudinal axis of the vehicle assembly.

11. The vehicle assembly according to claim 7, wherein a first position of the caliper is an upward position relative to the wheel support such that the caliper is above an axis of rotation of the wheel assembly and a second position of the damper mass is a downward position relative to the wheel support such that the third mass portion is opposite from the caliper relative to the axis of rotation of the wheel assembly.

12. The vehicle assembly according to claim 7, wherein a first position of the caliper is a bottom position relative to the wheel support and a second position of the damper mass is a top position relative to the wheel support.

13. The vehicle assembly according to claim 7, wherein the third mass portion includes a portion of stress concentration for the force applied at the first mass portion of the damper mass.

14. The vehicle assembly according to claim 7, wherein the second curved surface of the second mass portion includes a first portion that faces away from the first mass portion relative to the longitudinal axis and a second portion that faces outward relative to the lateral axis.

15. A vibration absorption system, comprising:
a damper mass coupled to a wheel assembly of a vehicle and including a first mass portion and a second mass portion connected by a third mass portion, the first mass portion including a curved surface, wherein a first portion of the curved surface faces away from the second mass portion relative to a longitudinal axis that extends along a length of the vehicle, and wherein a second portion of the curved surface faces inward relative to a lateral axis that is perpendicular to the longitudinal axis; and
an engagement portion coupled to a vehicle body of the vehicle and extending toward the wheel assembly, the engagement portion including a geometric feature that is shaped to induce rotation of the wheel assembly away from the longitudinal axis during an impact to the vehicle body by interaction of the geometric feature with the curved surface of the first mass portion.

16. The vibration absorption system according to claim 15, wherein the third mass portion is thinner in a lateral direction than the first mass portion and the second mass portion such that the third mass portion includes a portion of stress concentration such that the third mass portion is configured to separate within the portion of stress concentration in response to the impact to allow relative motion between the first mass portion and the second mass portion.

17. The vibration absorption system according to claim 15, wherein the geometric feature is formed from the vehicle body.

18. The vibration absorption system according to claim 15, further comprising a second engagement portion extending from the vehicle body, wherein the curved surface of the first mass portion is a first curved surface, wherein the second mass portion includes a second curved surface, and wherein the second engagement portion functions as a reaction surface for the impact to the vehicle body and the wheel assembly is configured to rotate away from the longitudinal axis in response to an interaction between the second engagement portion and the second curved surface of the second mass portion of the damper mass.

19. The vibration absorption system according to claim 18, wherein the engagement portion is a first engagement portion positioned forward of the wheel assembly and the second engagement portion is positioned rearward of the wheel assembly, the first engagement portion and the second engagement portion configured to cooperatively induce outward rotation of the wheel assembly upon a frontal force applied to the vehicle body.

20. The vibration absorption system according to claim 15, wherein the curved surface of the first mass portion is a first curved surface, wherein the first curved surface is at a first end of the damper mass, wherein the second mass portion has a second curved surface at a second end of the damper mass that is opposite the first end, and wherein the second curved surface faces outward relative to the lateral axis.

* * * * *